United States Patent [19]
Hino et al.

[11] 3,738,021
[45] June 12, 1973

[54] SYSTEM FOR SYNCHRONIZING SOUNDS WITH LEARNING MATERIALS

[75] Inventors: Tetsuo Hino; Takao Orita; Isao Kozu; Kiyoji Fujisawa; Akio Nishiyama; Katsutoshi Nishimura, all of Osaka-fu, Japan

[73] Assignee: Matsushita Electric Industrial Co., Ltd., Kadoma, Osaka, Japan

[22] Filed: Oct. 15, 1970

[21] Appl. No.: 80,918

[30] Foreign Application Priority Data
Oct. 20, 1969 Japan.................................. 44/84390

[52] U.S. Cl.................................................. 35/8 A
[51] Int. Cl. ............................................ G09b 5/06
[58] Field of Search........................... 35/8 A, 35 C; 40/28.1, 28.3

[56] References Cited
UNITED STATES PATENTS

| | | | |
|---|---|---|---|
| 3,540,132 | 11/1970 | Glass et al. | 35/8 A |
| 3,481,052 | 12/1969 | Dorsett | 35/8 A |
| 3,222,597 | 12/1965 | Beatenbough et al. | 35/8 A X |
| 3,245,156 | 4/1966 | De Blodis et al. | 35/8 A |

Primary Examiner—Wm. H. Grieb
Attorney—Wenderoth, Lind & Ponack

[57] ABSTRACT

A system for synchronizing sounds with learning materials has a sound reproducing device, learning materials, stopping means and detecting means. The sound reproducing device is stopped by means of the stopping means and is started again by the stopping means which is released from the stopped position in response to output signals of the detecting means generated by detecting a change of the next part of the learning materials.

5 Claims, 6 Drawing Figures

INVENTORS
TETSUO HINO
TAKAO ORITA
ISAO KOZU
KIYOJI FUJISAWA
AKIO NISHIYAMA
KATSUTOSHI NISHIMURA

BY *Wenderoth, Lind & Ponack*
ATTORNEYS

SYSTEM FOR SYNCHRONIZING SOUNDS WITH LEARNING MATERIALS

FIELD OF THE INVENTION

This invention relates to a system for synchronizing sounds with learning materials, and more particularly to a system for synchronizing the operation of a sound reproducing device, such as a magnetic tape recorder, a disc record player or the like, with learning materials, such as a book, a slide projector, or the like.

DESCRIPTION OF THE PRIOR ART

Usually, in a system for synchronizing sounds with learning materials, a change of learning materials is initiated manually or automatically by detecting marker signals recorded on the sound recording medium. In such an operation, the reproduction of the sound programs is continued unless the movement of the sound recording medium is stopped. Therefore, even if a learner is not able to understand the learning programs in the time the corresponding sound recording takes to run, succeeding sound programs continue to be reproduced. In order to allow enough time for learning any one part of a learning program, it is desired to stop and start the movement of the sound recording medium freely depending on the speed of the learning process. Heretofore, such devices have been relatively complicated to use. This problem of coordinating learning speed with the speed of the sound recording medium can be solved by using a special device having specified learning materials with sound programs, but there is still a problem that such a device has a complicated construction because it is necessary to use one medium for storing both the sound and learning program.

OBJECTS AND BRIEF SUMMARY OF THE INVENTION

An object of this invention is to provide a system for synchronizing a conventional sound reproducing device, such as a magnetic tape recorder, a magnetic sheet or disc recorder, a disc record player or the like, with visible learning materials comprising a plurality of successive parts, such as a book, a slide projector or the like.

Another object of this invention is to provide a synchronizing system capable of allowing any length of time for viewing a learning program forming part of the learning material by automatically stopping the reproduction of the sound programs at the end of each portion thereof corresponding to a part of the learning material and by automatically starting the sound program again when a change to the next part of the learning material is detected.

A further object of this invention is to provide a synchronizing system including a sound reproducing device in which the movement of the sound recording medium is stopped by detection of stop signals recorded on the sound recording medium, and then the movement of the sound recording medium is manually or automatically started when a change to the next part of the learning materials is detected.

Still another object of this invention is to provide a synchronizing system including a detecting switch designed to be in contact with learning materials to detect a change to the next part of the learning materials.

A still further object of this invention is to provide a synchronizing system including a detecting switch designed to be in contact with a page in a book to detect when the next page of the book is turned.

These objects are achieved by the provision of a system for synchronizing sounds with learning materials which has a sound reproducing device, learning materials, stopping means and detecting means. The sound reproducing device is stopped by means of the stopping means and is started again by the stopping means which is released from the stopped position in response to output signals of the detecting means generated by a change to the next part of the learning materials.

BRIEF DESCRIPTION OF THE DRAWINGS

This invention will be better understood by reference to the following description taken in connection with the accompanying drawings, wherein.

DETAILED DESCRIPTION OF THE INVENTION

Figure 1:
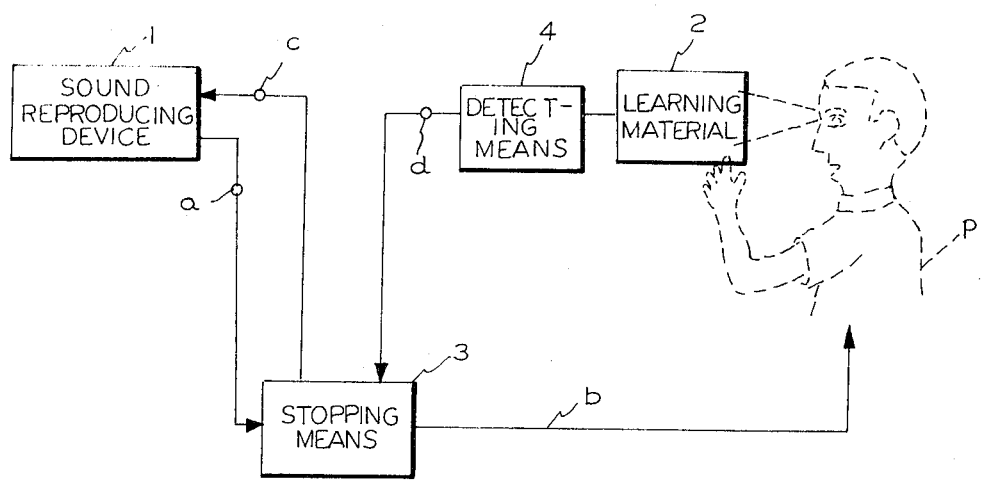
FIG. 1 is a schematic diagram showing the basic construction of the synchronizing system according to this invention.

Referring to FIG. 1, the basic construction of the synchronizing system according to this invention is shown in the block diagram. The system comprises: a sound reproducing device 1, such as a magnetic tape recorder, a magnetic sheet recorder, a disc record player or the like, operable with sound recording medium; a learning material 2 such as a book, a slide projector or the like; detecting means 4 for detecting a change to the next part of the learning materials 2; and stopping means 3, described later in detail in connection with FIG. 2. A plurality of sound programs and a plurality of stop signals are recorded on the sound recording medium included in the sound reproducing device 1. The learning material 2 has a plurality of picture programs which illustrate the sound programs. The sound reproducing device 1 has a remote control terminal c for controlling the movement of the sound recording medium and an output terminal a for sound programs and stop signals. These terminals are connected to stopping means 3. The line b from a stopping means 3 to the learner p indicates the action of the learner in changing to the next part of the learning material 2.

Figure 2:
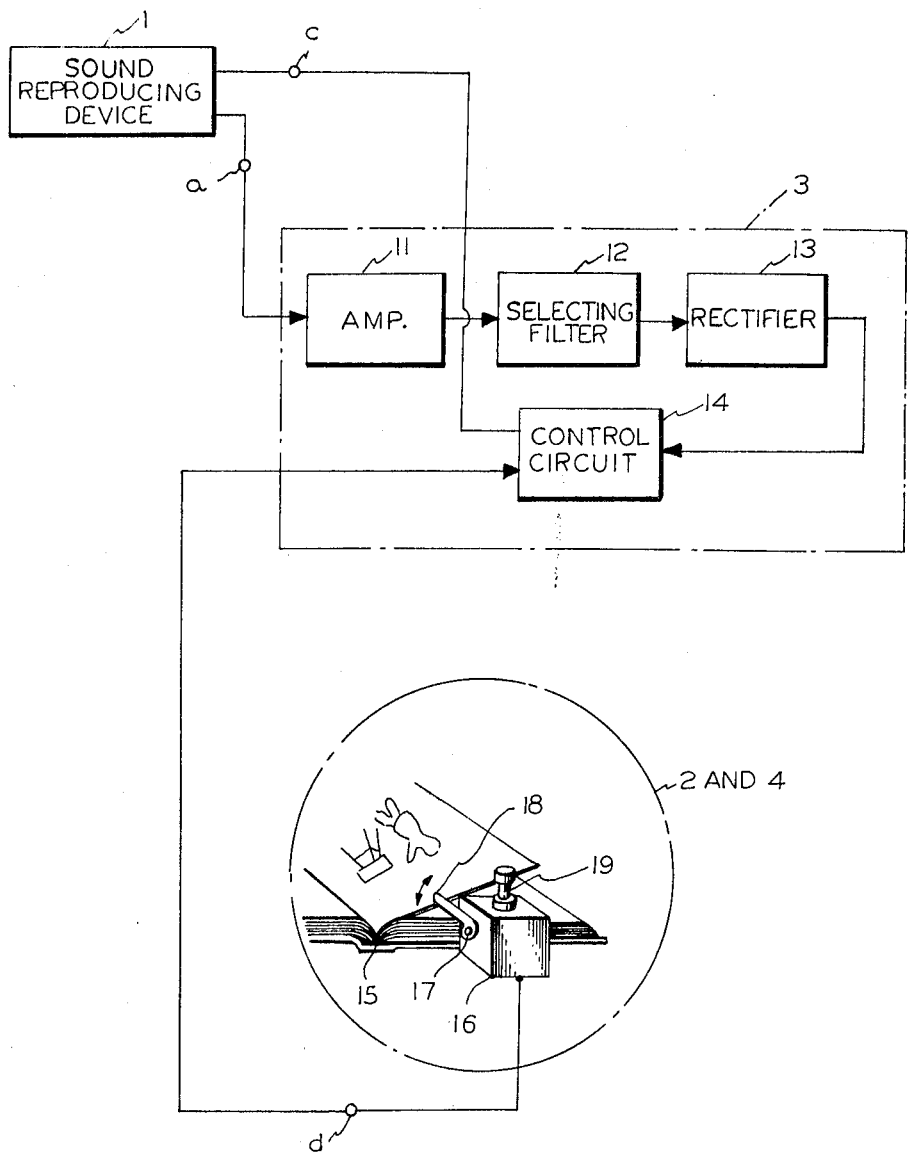
FIG. 2 is a schematic diagram of one embodiment of the stopping means and the detecting means according to this invention.

There is shown in FIG. 2 one embodiment of the stopping means 3, a book 15 which can be one of the possible learning materials 2 and a detecting switch 16 as one of the possible detecting means 4. The detecting switch 16 has a mechanical switch 17 such as a microswitch and a movable arm 18 mounted on a rotatable shaft forming part of the switch 17. The movable arm 18 is in contact with a page of the book 15 and is moved when the page of the book 15 is turned. The stopping means 3 includes a signal amplifier 11, a selecting filter 12 connected to the output of the amplifier for separating stop signals from reproduced signals, a rectifier 13 connected to the output of the selecting filter for rectifying stop signals and a control circuit 14 connected to the output of the rectifier for opening a normally closed external series circuit extending from remote control terminal c to switch the sound reproducing device off upon receiving an output from the rectifier 13. The detecting switch 16 has a triggering terminal d which is connected to the control circuit 14 in the stopping means 3 so as to cause the control circuit 14 to close the open external series circuit, whereby the operation of sound reproducing device 1 is caused to start. The exterior circuit can form part of the power supply circuit of the sound reproducing device 1, or can be a relay circuit controlling the power supply circuit. The detecting switch 16 has an auxiliary switch 19 to operate it manually so as to close the control circuit 14 independently of any movement of the page of the book 15.

The operation of this system will be described in detail referring to FIGS. 1 and 2. In the sound reproducing device 1, a plurality of sound programs and a plurality of stop signals recorded on the sound recording medium are reproduced when the sound recording medium moves, and they are supplied to the signal amplifier 11 of the stopping means 3 through the output terminal a. In the stopping means 3, applied signals are amplified by the signal amplifier 11 and are supplied to the selecting filter 12 where the stop signals are separated from the reproduced signals. The output signal from the selecting filter 12 is rectified by rectifier 13 so as to detect the presence of stop signals. When the rectified voltage level of stop signals exceeds a predetermined value, a control circuit 14, which is normally closed, is switched to the open condition. Thus, the circuit to the remote control terminal c is opened, and the movement of the sound recording medium is stopped. The detecting switch 16 having a movable arm 18 contacts the pages of the book and when the page of the book is turned it is closed. As a result, the control circuit 14 is closed through the triggering terminal d, and the circuit to the remote control terminal c is closed, whereby the sound recording medium moves again. The operating steps described above can be repeatedly carried out and the synchronization of sounds with the change to the next part of the learning materials is achieved.

In this system, the sound recording medium is utilized effectively for its full length because the parts of the sound program and the stop signals are successively recorded on the sound recording medium without it being necessary to provide pauses for learning between parts of the sound program.

A learner p is able to take enough time to learn each part of the learning material, because the movement of the sound recording medium starts again only when a learner changes to the next part of the learning materials after seeing and understanding a given part of the learning materials. In this system the line b from the stop means 3 to the learner p indicates that the control loop for the parts of the operating process is closed by completion of learning and the change to the next part of the learning materials. For a detecting switch 16 there can be used an easily operable switch, such as a microswitch, which is easily moved by a page of the book 15. The detecting switch 16 is placed in contact with the book 15 by mounting a base plate on the detecting switch 16 on a cover of the book 15.

Figure 3:
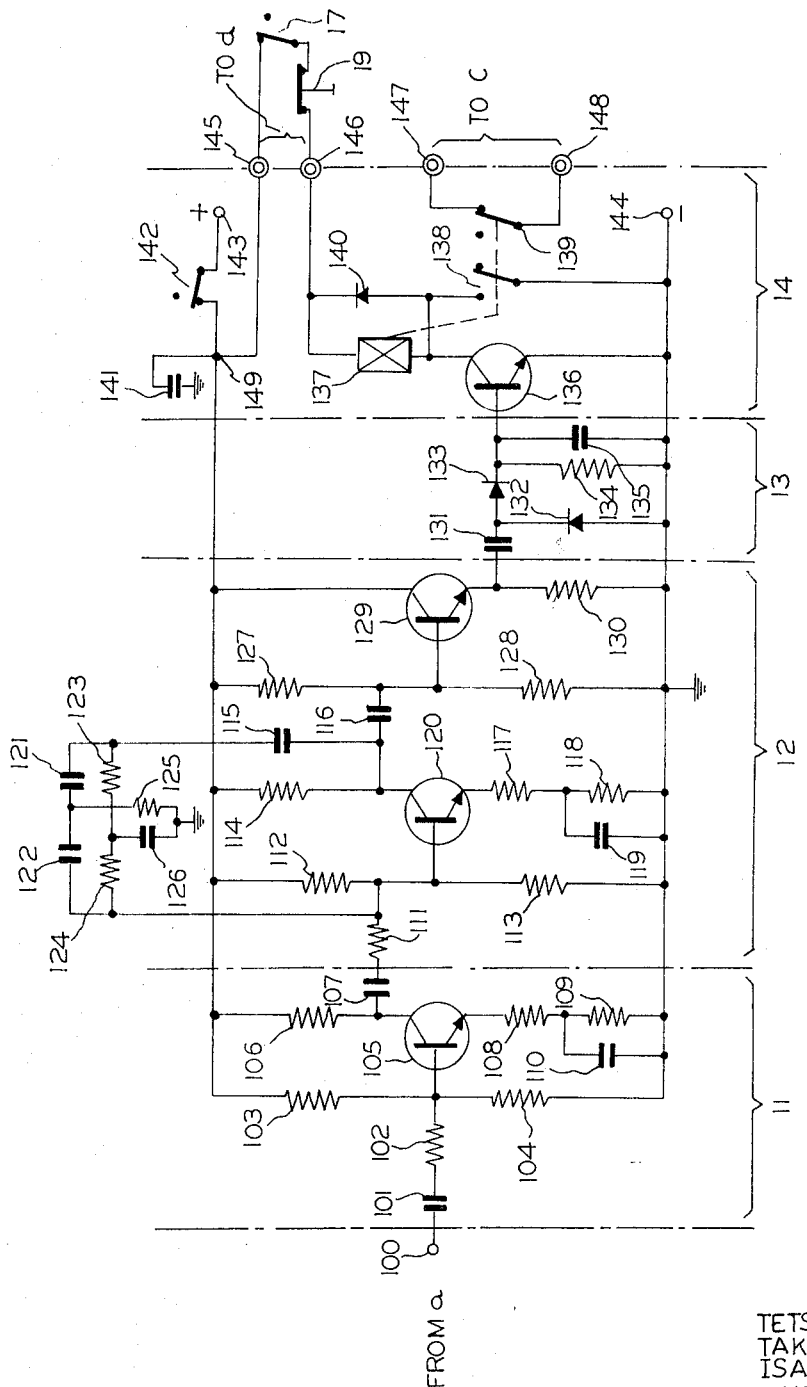
FIG. 3 is a circuit diagram illustrating the stop means according to this invention.

FIG. 3 is a circuit diagram showing an embodiment of the stopping means. The signal amplifier 11 includes a transistor 105, an input condenser 101 and an input resistor 102 connected in series between terminal 100 and the base of the transistor. Base biasing resistors 103 and 104, emitter resistors 108 and 109, an emitter by-passing condenser 110, a collector load resistor 106 and an output condenser 107 are all connected in a conventional manner to the transistor 105. Signals applied from the output terminal a of the sound reproducing device 1 to the input terminal 100 are fed to the base of the transistor 105 through the input condenser 101 and the input resistor 102, and amplified signals appear across the collector load 106. Output signals from the signal amplifier 11 are fed to the base of a selecting filter 12 through the output condenser 107 and a coupling resistor 111. The selecting filter 12 comprises a frequency selective filter and an emitter follower. The frequency selective filter includes a transistor 120, base biasing resistors 112 and 113, emitter resistors 117 and 118, an emitter by-passing condenser 119, a collector load resistor 114, a coupling condenser 115 and a parallel T network connected to the negative feedback path from the collector to the base of the transistor 120 through the coupling condenser 115. The parallel T network contains series connected condensers 121 and 122, a grounded resistor 125 for one T network, and series connected resistors 132 and 124, and a grounded condenser 126 for another T. network. Stop signals are separated from reproduced signals by the frequency selective filter. Output signals from the frequency selective filter are fed to the emitter follower through an output condenser 116. The emitter follower includes a transistor 129, base biasing resistors 127 and 128 and an emitter resistor 130. Thus, stop signals appear across the emitter resistor 130 of the transistor 129 and are fed to a rectifier 13. The rectifier 13 includes a coupling condenser 131, diodes 132 and 133 which form a voltage doubling rectifier, a discharge resistor 134 and a smoothing condenser 135. By this rectifier 13, stop signals are rectified and are supplied to a control circuit 14. The control circuit 14 includes a transistor 136, a relay 137 and a shunt diode 140 connected in parallel with the relay 137. The emitter of the transistor 136 is grounded, and the collector is coupled through the parallel connected relay 137 and shunt diode 140 and terminals 145 and 146 to a D.C. source 149. The relay 137 has a normally open self-holding contact 138 and a normally closed switching contact 139. The stationary contact of the self-holding contact 138 is connected to the collector of the transistor 136, while the movable contact thereof is connected to ground. The switching contact 139 has the stationary and movable contacts thereof connected to terminals 147 and 148, respectively. Terminals 145 and 146 are connected to the triggering terminal d of the detecting switch 16, the circuit of which is normally closed. The manual operating switch 19 is connected in series with the mechanical switch 17 of the detecting switch 16. Terminals 147 and 148 are connected to the remote control terminal c for externally controlling the movement of the sound recording medium of the sound reproducing device 1.

When the level of the rectified voltage of the stop signals exceeds the threshold voltage of the transistor 136, a collector current flows through the relay 137 and the self-holding contact 138 is closed. As a result, the collector is grounded through the contact 138 and the relay 137 is held in the energized condition unless the mechanical switch 17 or the manual operating switch 19 is opened. Therefore, the contact 139 is opened and the external circuit of the remote control circuit c is opened so as to stop the movement of the sound recording medium.

When the mechanical switch 17 of the detecting switch 16 is opened by the turning of a page, the supply of D.C. voltage to the collector of the transistor 136 is switched off and the relay 137 is deenergized. Thus, the self-holding contact 138 and switching contact 139 are restored to their normal positions and the external circuit from the remote control terminal c is closed, and the movement of sound recording medium starts. A switch 142 for switching the D.C. voltage on or off is connected between the D.C. source connection 149 and a positive voltage terminal 143. A negative voltage terminal 144 is grounded. A condenser 141 is connected between the D.C. source connection 149 and ground to smooth any voltage ripple.

As a sound reproducing device 1 for this system, a magnetic tape recorder, a magnetic sheet recorder, a disc record player or the like having a remote control terminal for controlling the movement of sound recording medium and an output terminal for sound programs can be used without any change in the operation of this system. The auxiliary switch 19 is used not only for correcting the relation of the sound program to the parts of the learning program, but also for manually starting the movement of the sound recording medium independently of a change of the learning materials.

Figure 4:
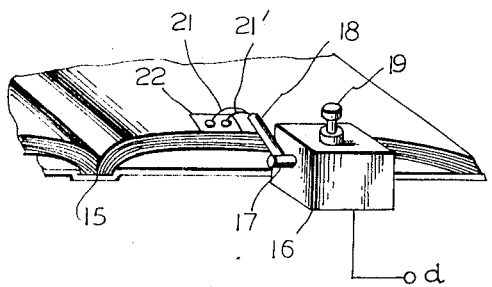
FIG. 4 is a schematic illustration of another type of detecting means according to this invention.

Another type of detecting switch is shown in FIG. 4. In FIG. 4 the book 15 has a conductive part 22 which is provided on the sheet requiring the explanation from the sound reproducing medium and the detecting switch 16 has two electrodes 21 and 21' which are provided on the end of a movable arm 18. The electrodes 21 and 21' normally form a conductive circuit when they touch the conductive part 22 on the book 15. The electrodes 21 and 21' are disconnected from conductive part 22 when a page is turned and the control circuit 14 is actuated to open the external circuit from the remote control terminal c. The movement of sound recording medium is started again only when electrodes 21 and 21' are in contact with the conductive part 22 which is provided on the sheet requiring the sound explanation.

Figure 5A:
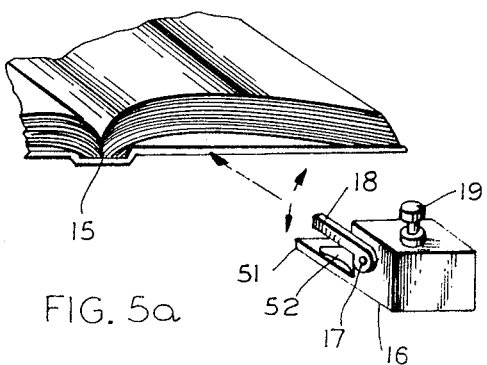
FIGS. 5a and 5b are schematic illustrations of detecting means for contact with the learning material and embodiments of the detecting switch.

FIG. 5a shows a means for mounting the detecting switch 16 on the book 15. The detecting switch 16 includes a base plate 51 and a flexible panel 52. The cover of the book 15 is inserted between base plate 51 and flexible panel 52 so that the detecting switch 16 is contacted and moved by the pages of the book 15 when a page of the book is turned.

Figure 5B:
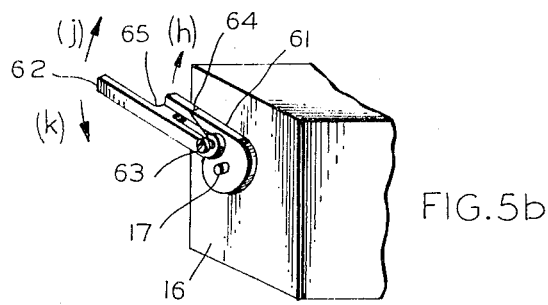

The movable arm 18 mounted on the shaft 17 of the detecting switch 16 can be constructed so that it is moved when a page is turned in both forward and reverse directions but actuates the switch only when the page is turned forward. FIGS. 5b shows a detailed embodiment of such a detecting switch 16. The shaft 17 of the detecting switch 16 is operated by a turn of the page only in the forward direction, as shown by arrow h in FIG. 5b. A movable arm has a main arm 61 which is fixed to the rotational shaft 17 of the easily operated mechanical switch, a sub-arm 62, a holding pin 63 which rotatably mounts the sub-arm 62 on the main arm 61 so that the sub-arm 62 is free to rotate relative to the main arm 61, except when it is caught by a projection 65 on the sub-arm 62, and a spring 64 pressing the sub-arm 62 against the main arm 61. The main-arm 61 and thus the switch shaft 17 are moved together with the sub-arm 62 by the projection 65 on the subarm 62 in the direction h, when the sub-arm 62 is moved by the page turning in a forward direction as shown by the arrow j. On the other hand, when the sub-arm 62 is moved by the page as it turns in the reverse direction, as shown by arrow k, the main arm 61 is not moved, and the switch shaft 17 is not rotated in the reverse direction. There is no difficulty in turning the page in either the forward or the reverse direction, because the movable arm 18 can be easily moved in both directions.

It will be apparent from the foregoing that while a particular form of this invention has been illustrated and described, various modifications can be made without departing from the spirit and scope of the invention as defined by the appended claims.

What is claimed is:

1. A system for synchronizing sounds with a visible learning material having a plurality of successive parts, said system comprising a sound reproducing device operable with a sound reproducing medium having recorded thereon a plurality of parts of a sound program and a plurality of stop signals corresponding to said plurality of successive parts;

stopping means coupled to said sound reproducing device for stopping the movement of said sound reproducing device in response to said stop signals; and a detecting switch mounted on the learning material and including a movable arm responsive to movement of each part of the learning material in correspondence with each manual operation of changing from one part of the learning material to another successive part, said detecting switch being coupled to said stopping means to actuate said stopping means, upon movement of said movable arm, to release said sound reproducing device from the stopped position in correspondence with each manual operation of changing one part of the learning material to another successive part.

2. A system as claimed in claim 1 wherein said detecting switch comprises a mechanical switch actuated by said movable arm.

3. A system as claimed in claim 1 wherein said plurality of successive parts comprises a plurality of pages of a book, and said movable arm is responsive to turning of the pages.

4. A system as claimed in claim 1 wherein said detecting switch includes a manually operated auxiliary switch to operate said stopping means manually to start said sound reproducing device.

5. A system for synchronizing sounds with a visible learning material having a plurality of successive parts, said system comprising a sound reproducing device operable with a sound reproducing medium having recorded thereon a plurality of parts of a sound program and a plurality of stop signals corresponding to said plurality of successive parts;

stopping means coupled to said sound reproducing device for stopping the the movement of said sound reproducing device in response to said stop signals; and a detecting switch mounted on the learning material so as to be responsive to movement of each part of the learning material in correspondence with each manual operation of changing from one part of the learning material to another successive part and being coupled to said stopping means to actuate said stopping means to release said sound reproducing device from the stopped position in correspondence with each manual operation of changing one part of the learning material to another successive part, said detecting switch comprising a conductive circuit having two electrodes and a conductive part adapted to be placed on said learning material and normally touched by said electrodes at times other than when changing from one part of the learning material to another part, said electrodes being separated from said conductive part in correspondence with each manual operation of changing one part of the learning material to another successive part.

* * * * *